(12) United States Patent
Meador et al.

(10) Patent No.: US 6,979,721 B1
(45) Date of Patent: Dec. 27, 2005

(54) SUBSTITUTED CYCLOHEXENE ENDCAPS FOR POLYMERS WITH THERMAL-OXIDATIVE STABILITY

(75) Inventors: Mary Ann B. Meador, Strongsville, OH (US); Aryeh A. Frimer, Rehovot (IL)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 85 days.

(21) Appl. No.: 10/693,852

(22) Filed: Oct. 23, 2003

(51) Int. Cl.⁷ .................. C08G 73/10; C08G 69/28; B32B 27/00
(52) U.S. Cl. .................. 528/353; 528/125; 528/126; 528/128; 528/170; 528/171; 528/172; 528/173; 528/174; 528/176; 528/179; 528/183; 528/188; 528/220; 528/229; 528/350; 528/351; 528/352; 428/411.1; 428/473.5
(58) Field of Search .................. 528/170, 125, 528/126, 350–353, 171, 128, 172, 174, 173, 528/176, 179, 183, 188, 220, 229; 428/473.5, 428/411.1

(56) References Cited

U.S. PATENT DOCUMENTS

| | | | |
|---|---|---|---|
| 4,302,575 A | 11/1981 | Takekoshi | 528/185 |
| 4,376,733 A * | 3/1983 | Frimer | 549/268 |
| 4,963,645 A | 10/1990 | Inoue et al. | 528/342 |
| 5,288,842 A * | 2/1994 | Feger et al. | 528/335 |
| 5,914,385 A * | 6/1999 | Hayashi et al. | 528/170 |
| 6,274,699 B1 * | 8/2001 | Meador | 528/353 |
| 6,303,744 B1 * | 10/2001 | Meador et al. | 528/353 |

* cited by examiner

*Primary Examiner*—P. Hampton Hightower
(74) *Attorney, Agent, or Firm*—Kent N. Stone; James V. Tura

(57) ABSTRACT

This invention relates to polyimides having improved thermal-oxidative stability, to the process of preparing said polyimides, and the use of polyimide prepolymers in the preparation of prepregs and composites. The polyimides are particularly useful in the preparation of fiber-reinforced, high-temperature composites for use in various engine parts including inlets, fan ducts, exit flaps and other parts of high speed aircraft. The polyimides are derived from the polymerization of effective amounts of at least one tetracarboxylic dianhydride, at least one polyamine and a novel dicarboxylic endcap having the formula:

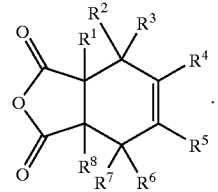

23 Claims, No Drawings

SUBSTITUTED CYCLOHEXENE ENDCAPS FOR POLYMERS WITH THERMAL-OXIDATIVE STABILITY

ORIGIN OF INVENTION

The invention described herein was made by an employee of the United States Government and may be manufactured and used by or for the Government for governmental purposes without the payment of any royalties thereon or therefore.

BACKGROUND OF INVENTION

1. Field of the Invention

This invention relates to polyimides having improved thermal-oxidative stability, said polyimides derived from the polymerization of effective amounts of polyamines, tetracarboxylic dianhydrides and novel dicarboxylic endcaps. More specifically, this invention relates to all types of PMR (polymerization monomeric reactants) polyimides and to the use of these novel polyimides in the preparation of PMR resins and composites. The polyimides are derived from the polymerization of various polyamines, e.g. aromatic diamines, tetracarboxylic dianhydrides and a novel class of dicarboxylic endcaps. These dicarboxylic endcaps were found to substantially increase the lifetime and use temperatures of polyimide matrix composites allowing their use in various engine parts—such as inlets, fan ducts, exit flaps etc.—for high speed aircraft and the like. Ultimately, the payoff for using these novel polyimides in developing polymer composites that can operate at higher temperatures is the weight savings of 10 to 20% over other engine parts made from conventional materials.

2. Description of Related Prior Art

In structural applications, fiber-reinforced high-temperature polyimide matrix composites offer significant advantages over other materials because of their low density and high specific strength. These composites are attractive for use in aerospace systems, e.g. aircraft engines, airframe, missiles, and rockets, where weight is critical. This weight reduction has substantial benefits in terms of fuel savings, an increased passenger, cargo load, or increased speed and maneuverability. The durability and reliability of materials used in aerospace components is a critical concern. Among the materials requirements for these applications are a high glass-transition temperature, $T_g$, (at least 25° C. higher than the intended use temperature), good high-temperature stability in a variety of environments, and good mechanical properties over a wide range of temperatures. In general, the stability and $T_g$ of most organic polymers limit their use, at best, to applications in which temperatures are not higher than 350 to 370° C.

Addition-curing polyimides were investigated in an attempt to improve the processibility of condensation polyimides without adversely affecting their stability and high-temperature performance. The most noteworthy development is the Polymerization of Monomer Reactant (PMR) family of polyimides, in particular PMR-15, developed at the NASA Lewis Research Center. For PMR-15, reinforcement fibers are impregnated with a solution of the dialkyl ester of 3,3",4,4'-benzophenone tetracarboxylic acid (BTDE), methylenedianiline (MDA), and the monoalkyl ester of 5-norbornene-2,3-dicarboxylic acid (NE), in a low boiling solvent, typically methanol or ethanol. In the first step of this process, these monomers undergo imidization at temperatures around 200° C. to yield short-chain norbornene end-capped polyimide oligomers, ($MW_{theoretical}$= 1500 for PMR-15). At temperatures above 300° C., these oligomers undergo a cross-linking reaction involving the norbornene endcap.

In the PMR system, melt viscosity and resin flow can be controlled, to some extend, by varying monomer stoichiometry, which enables the removal of volatile by-products produced in the condensation reaction and leads to composites with fairly low-void contents. PMR-15 has a $T_g$ after post-cure of 365° C. and has good retention of mechanical properties and low weight losses in air for long exposure times (>10,000 h) at temperatures up to 230° C. and for shorter times at temperatures as high as 316° C. While norbornene end-caps have been used successfully in a number of polyimide systems, there are some drawbacks to their use. The thermal-oxidative stability of the norbornene ring is poor due to the large amount of saturated carbons present in this structure. For this reason, the norbornene end-cap and the structures that result from its cross-linking often become the oxidative weak link in polyimides in which it is used. In addition, processing problems can be encountered with norbornene end-capped polymers due to the potential for formation of cyclopentadiene during cross-linking. These deficiencies have prompted the search for new addition-curable end-caps for polyimides.

For example, Jones and co-workers (*J. Polym. Sci. Part A, Polym. Chem.* 1995, 33:767–70) utilized the Diels-Alder cycloaddition between bis(furyl)imide and BMI to produce polyimide. The authors postulate that dehydration occurs between 204 and 288° C., thus leading to a more stable polyimide. Carbon fiber-reinforced composites processed at 400° F. (230° C.), and post-cured at 600° F. (316° C.) had good initial flexural strength at room temperature (123.5 Ksi) and at 600° F. (127.5 Ksi). These composites had modest thermal-oxidative stability; samples aged in air for 1000 hours at 316° C. had an 18% weight loss. Flexural strength of these composites dropped from 172 to 66 Ksi after aging under these conditions.

In the prior art, U.S. Pat. No. 4,739,030 (H. R. Lubowitz et al.) discloses difunctional, crosslinking end-cap monomers useful in the synthesis of high performance oligomers that contain polysulfone or polyethersulfone backbones. The difunctional endcap monomers useful in the preparation of oligomers which are resistant to organic solvents comprise various imidophenols that contain the norbornene group. U.S. Pat. No. 5,594,089 (H. R Lubowitz et al.) discloses linear or multidimensional heterocycle or heterocycle sulfone oligomer having two or four crosslinking sites at each end of its backbone. The multiple chemically functional end cap monomers include organic compounds containing the norbornene group. U.S. Pat. Nos. 5,756,597; 5,817,744; and 5,969,079 (H. R. Lubowitz et al.) further disclose resins that are improved by forming four crosslinks at each addition polymerization site in the backbone of the resin using crosslinking functionalities of a general formula which contain the norbornene group.

U.S. Pat. No. 5,145,943 (J. Y. Lee et al.) discloses polyimides derived from 4,4'-methylenedianiline (MDA), 3,3',4,4'-benzophenonetetracarboxylic acid methyl ester (BTDE), and 5-norbornene-2,3-dicarboxylic acid methyl ester (NDE) with molar ratio of 3:2:2. U.S. Pat. Nos. 3,745,149 and 5,338,827 (Serafini et al.) disclose polyimides prepared by the reaction of a mixture of monomers comprising dialkyl ester of an aromatic tetracarboxylic acid, an aromatic diamine, and a monoalkyl or dialkyl ester of a dicarboxylic acid where the ratio is n:(n+1):2, wherein n has a value of from 1 to 20. Patentees disclosed polyimides that can be processed from a mixture of monomeric reactants using lower alcohols to esterify an anhydride endcap and an aromatic dianhydride. These monomeric reactants when combined with an aromatic diamine form a monomeric mixture which at high temperature polymerize to a polyimide. This procedure was the evolution of the terminology PMR (polymerization of monomeric reactants).

SUMMARY OF THE INVENTION

This invention relates to novel compositions of matter and specifically to the preparation of novel polyimides by the PMR process. These novel polyimides have improved thermal-oxidative stability and are derived from the polymerization of effective amounts (stoichiometric amounts to prepare polyimides) of at least one polyamine, at least one tetracarboxylic dianhydride and novel dicarboxylic endcaps having a formula:

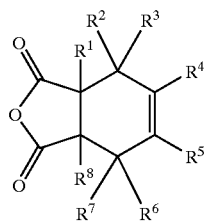

wherein $R^1$ is selected from the group consisting of an alkyl, fluoroalkyl, aryl, fluoroaryl, OR, carboxy, nitro, cyano, $NR_2$ i.e. R—N—R, $SO_3R$, $PO_4R$, F and Cl radicals where R is selected from the group consisting of hydrogen, an aryl radical, and an alkyl radical of 1 to 6 carbons and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, $NR_2$ i.e. R—N—R, $SO_3R$, $PO_4R$, F and Cl radicals where R is selected from the group consisting of hydrogen, an aryl radical, and an alkyl radical of 1 to 6 carbons.

Alternatively, $R^2$ and $R^3$ are the same or different radicals selected from the group consisting of alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons; and wherein, $R^1$, $R^4$, $R^5$, $R^6$, $R^7$, $R^8$ are the same or different radicals selected from the group consisting of hydrogen, alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons.

Accordingly, it is an object of this invention to provide latent reactive carboxylic endcaps as replacements for the norbornene-endcap in the preparation of polyimides.

It is another object of this invention to provide novel carboxylic endcaps that preserve the desired processibility of norbornene endcaps in the preparation of PMR polyimide resins.

It is a further object of this invention to provide novel endcaps in the preparation of void-free polyimide composites.

It is still a further object of this invention to provide novel endcaps that allows the use of higher temperatures and prolongs the life of PMR polyimides used in the preparation of composites.

It is still a further object of this invention to provide novel endcaps in the preparation of polyimide prepregs without adversely affecting the processibility of PMR composites.

These and other object of this invention will become apparent from a further and more detailed description of the invention as follows.

DESCRIPTION OF THE PREFERRED EMBODIMENTS

This invention relates to polyimides having improved thermal-oxidative stability and to the process of preparing said polyimides and the use thereof in preparing polyimide composites which comprises polymerizing at least one polyamine e.g. an aromatic diamine with at least one tetracarboxylic dianhydride and novel dicarboxylic endcaps. Some of the tetracarboxylic dianhydrides are preferably selected from the group consisting of 3,3',4,4'-benzophenone tetracarboxylic dianhydride (BTDA); 1,1,1,3,3,3-hexaflurorisopropylidene bisphthalic acid dianhydride (HFDA or 6FDA); 1,2,4,5-pyromellitic dianhydride (PMDA); 3,3',4,4'-oxydiphthalic dianhydride (OPDA) and 3,3',4,4'-biphenyltetracarboxylic dianhydride (BPDA) and the corresponding lower diester-diacid and the diester-diacids of other aromatic dianhydride acids such as BTDA, 6FDA, PMDA, ODPA, and BPDA. These dianhydrides and esters thereof and methods for their preparation are known in the art and are specifically disclosed in U.S. Pat. No. 3,745,149 and U.S. Pat. No. 3,856,752; the disclosure of which are hereby incorporated herein. In preparing the polyimide, various polyfunctional aromatic amines, including the diamines, triamines and tetraamines and mixtures thereof are polymerized with the tetracarboxylic dianhydrides and the carboxylic endcap.

It is an object of this invention to use the novel latent reactive carboxylic endcaps as a replacement for the norbornene-endcap (NE) which are presently being extensively utilized in high temperature polymers for preparing composite. NE serves to control molecular weight during oligomerization and, at elevated temperatures, crosslinks to form a stable network structure. Moreover, NE is important to the processibility of high temperature resins because it does not give off volatile by-products during final cure and, therefore, allows the production of void-free composites. However, NE is the oxidative weak link in addition polymers used in preparing composite. For example, it limits the use of norbornene endcapped polyimide matrices to 315° C. temperatures for lifetimes up to 1000 hours. This invention provides a class of replacement carboxylic endcaps that preserve the desired processibility of NE. Moreover, the novel endcaps oxidize in a controlled process to increase the long term stability over that of the NE. Hence, the use temperature can be raised and/or lifetimes can be prolonged.

More specifically, polyimides are polymers composed of alternating units of diamine and dianhydride, linked to each other via imide bonds. These high temperature polyimides are used to prepare matrix composites used in the cooler parts of aircraft engines because of their high specific strength and lower density compared to other materials such as metals. PMR polyimides, commonly used in the aerospace industry, are generally capped at each end by a norbornenyl endcap which serves a double function: (1) it limits the average molecular weight of the polymer chains (oligomers), thereby allowing flow and improving processibility; (2) upon further treatment (curing), the endcap crosslinks the double bond into a tough heat-resistant component; see Scheme 1.

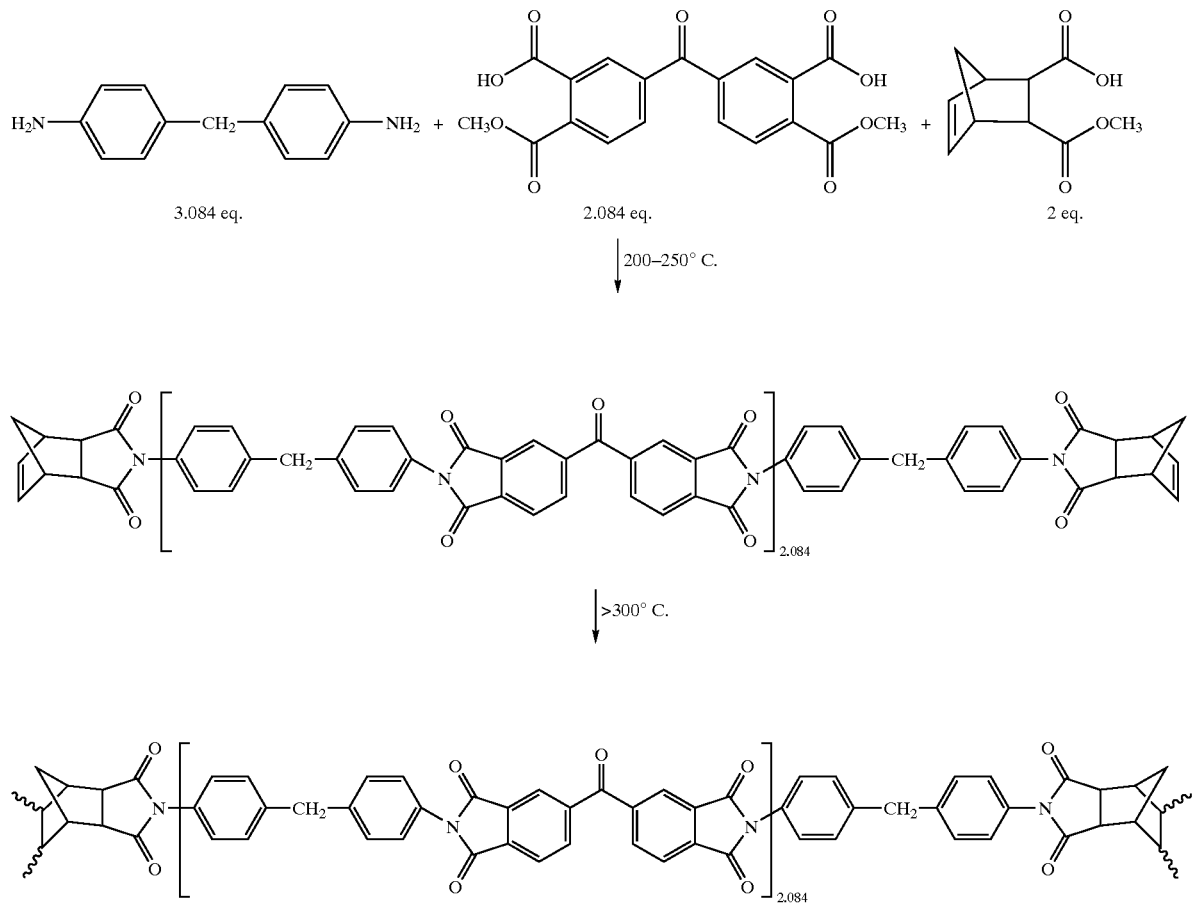

Scheme 1 is the typical reaction for addition polyimides (PMR-15) capped with a prior art norbornene endcap. However, it is this very endcap, so important to processing, that accounts for much of the weight loss in the polymer on aging in air at elevated temperatures. Thus, the endcap limits the use of PMR polyimides to lower temperature parts of the engine and/or shorter lifetimes. Understanding this degradation provided the clues for designing new endcaps to slow down degradation, and prolong the lifetime of the material. The poor thermo-oxidative stability of the endcap is a known problem. Researchers have tried to improve the stability by a variety of means, but most prominently by utilizing structures with more aromatic character, e.g. Cycap, V-cap, PEPA, acetylene terminated imides (ATI), benzocyclobutenes and biphenylenes (see: M. A. Meador, *Ann. Rev. Mat. Sci.*, 1998, 28:599–630). However, each modification resulted in changes in the nature of the crosslinking and undesirable changes in processibility (e.g., V-cap and ATI both crosslink at a considerably lower temperature—during imidization—and cause early gelation), and/or mechanical behavior (e.g., in the case of PEPA, the $T_g$ is considerably lower). There is also a sizable increase in cost (e.g., Cycap). The oxygen-bridged analogues of the norbornene endcap have been considered; see: E. A. Burns, R. J. Jones, and W. P. Kendrick, Final Report, NASA CR-72633, 1970. Unfortunately, this structure favors retro-Diels-Alder reaction over crosslinking through the double bond, and therefore does not give the same type of crosslinked structure.

The primary purpose of the present invention is to lower the amount of weight loss and the thermo-oxidative aging of PMR-polymers over their lifetime that results from the facile degradation of the nadic endcap. Previous work on the aging of PMR-15 revealed that the degradation of the nadic endcap occurs (as shown in Scheme 2) via two primary pathways. Path A, degradation proceeds through initial scissions and oxidative opening of the norbornyl ring to form a 1-hydroxy substituted maleimide (1). Path B, degradation proceeds through oxidation of the bridging methylene of the norbornyl moieties followed by carbon monoxide extrusion. Aromatization of the resulting biradical leads to substituted phthalimides (3) and related secondary degradation products. Path A, oxidation products (2) are cleavage products that are most likely formed concomitant with large amounts of weight loss in the polymer system. In contrast, structures (3) and (4) from path B are more oxidatively stable and form with very little weight loss. Therefore, new endcap structures which more strongly favor path B degradation will lead to lower weight loss in addition polyimides, and result in less shrinkage and cracking in the oxidation layer.

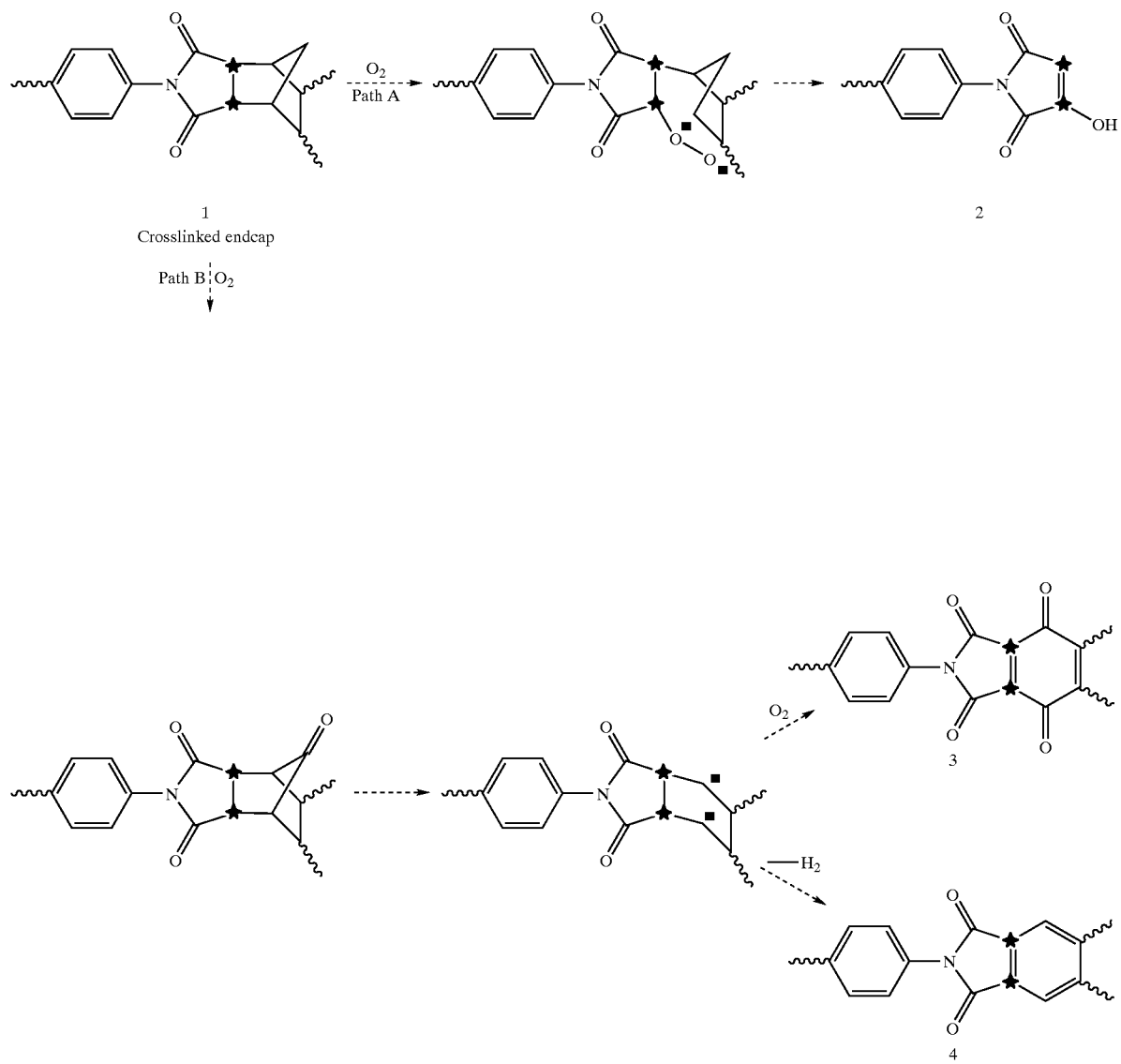

SCHEME 2

1
Crosslinked endcap

Path A degradation proceeds through initial opening of the norbornyl ring to form a biradical which undergoes attack of oxygen to form a 2-hydroxy substituted maleimide 2. Path B degradation proceeds through oxidation of the bridging methylene of the norbornene moieties followed by carbon monoxide extrusion. Aromatization of the intermediate biradical leads to substituted quinone 3 or phthalimide 4, and related secondary degradation products.

Path A oxidation products like 2 are cleavage products that are most likely formed concomitant with large amounts of weight loss in the polymer system. In contrast, structures like 3 and 4 from path B are formed with very little weight loss. Therefore, new end cap structures that more strongly favor path B degradation should lead to lower weight loss in addition polyimides, and result in less shrinkage and cracking in the oxidation layer.

Recently, we reported on our design of new end caps that might favor path B degradation (Meador, M. A. B.; Johnston, J. C.; Hardy-Green, D.; Frimer, A. A.; Gilinsky-Sharon, P.; Gottlieb, H. E. *Chemistry of Materials,* 2001, 13, 2649–2655; M. A. B. Meador and A. A. Frimer, U.S. Pat. No. 6,303,744) We proposed to utilize structures like 5 in Scheme 3 where X is more labile than the C-7 methylene of the nadic endcap or is easily oxidized to a more labile group under aging conditions. In particular, we studied the 7-hydroxy analog 6 (i.e., 5, X=CHOH, Scheme 3). In the air-aging polymer, the hydroxy-bearing carbon oxidizes to carbonyl and should, therefore, more highly favor path B degradation. Indeed, the solid NMR spectral changes observed are all consistent with rapid conversion of the aliphatic crosslink to an aromatic one via Path B or bridge degradation.

SCHEME 3

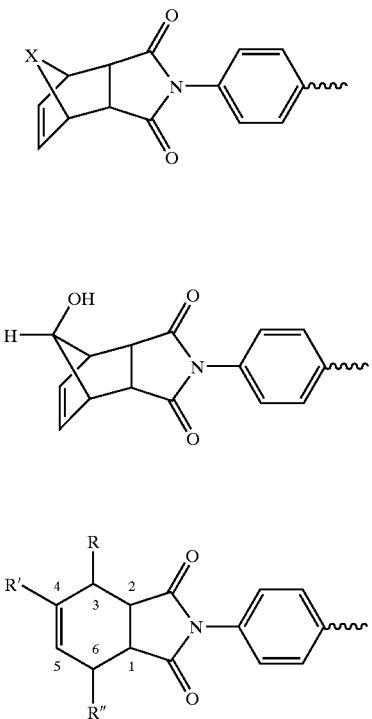

Polyimides having 1,2,3,6-tetrahydrophthalimide (7, R=R'=R"=H, Scheme 3) and variously substituted analogs, as the imidized end cap that contains no X group at all, have also been explored. This structure was investigated by TRW and NASA in the 1980's and found to yield composites with TOS values better than PMR-15, but which were quite frangible [Dr. William B. Alston, NASA Glenn Research Center, personal communication (Aug. 16, 2002)]. A. K. St. Clair and T. L. St. Clair (*Polym. Eng. Sci.* 1982 22, 9–14) explored 1,2,3,6-tetrahydrophthalimide as the imidized end cap for polyimide adhesives. However, they reported that no crosslinking occurred in this system until 415° C., as evidenced by differential scanning calorimetry (DSC). Meador (M. A. B. Meador, U.S. Pat. No. 6,274,699) describes the use 1,2,3,6-tetrahydrophthalimides 7, substituted in the 3, 4 and/or 6 positions, where the crosslinking temperature is lowered by substitution on the ring. The onset of decomposition for polymers made with this end cap was shown to be at a higher temperature than for the norbornenyl-end cap.

We have reinvestigated the 1,2,3,6-tetrahydrophthalimides 7 discussed by Meador and have discovered that the substitution does not lower the frangibility of the resulting polyimides. We also revealed that these tetrahydrophthalic endcaps not only experience the desired crosslinking yielding 8, but aromatize—without crosslinking—to the phthalic analog 9 (Scheme 4).

SCHEME 4

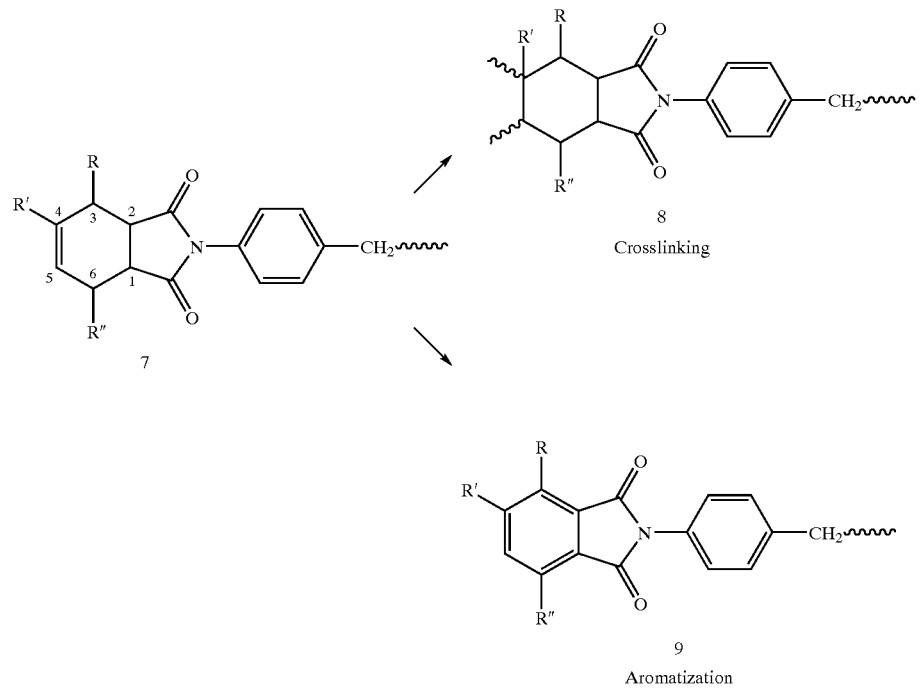

It is this competition, which yields a substantial percentage of aromatic product with the concomitant lowering of the relative amount of crosslinking, that is responsible for both the improved TOS of tetrahydrophthalic endcapped polyimides (greater aromatic content) and their substantial frangibility (lower crosslinking). The thermolysis of the tetrahydrophthalimides under inert atmosphere dramatically lowers the amount of aromatization; hence, the mechanism for aromatization is presumably an oxidative one. Aromatization can be effectively inhibited by a variety of techniques. For example, the ring can be substituted at C-1 or C-6 with an alkyl group or another substituent that is stable during processing. Similarly, disubstitution at C-3 or C-6 with alkyl groups or other substituents that are stable during processing will likewise inhibit aromatization.

Accordingly, the present invention is directed to a class of new endcaps, illustrated by structure 10 in Scheme 5, in which aromatization is inhibited and which exclusively or primarily undergoes crosslinking.

SCHEME 5

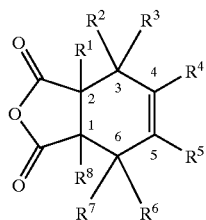

10 wherein $R^1$ is selected from the group consisting of an alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons; and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons.

Alternatively, $R^2$ and $R^3$ are the same or different radicals selected from the group consisting of alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons; and wherein, $R^1$, $R^4$, $R^5$, $R^6$, $R^7$, $R^8$ are the same or different radicals selected from the group consisting of hydrogen, alkyl, fluoroalkyl, aryl, fluoroaryl, OR, carboxy, nitro, cyano, $NR_2$ (R—N—R), $SO_3R$, $PO_4R$, F and Cl radicals where R is selected from the group consisting of hydrogen, an aryl radical, and an alkyl radical of 1 to 6 carbons.

Many of the above compounds have synthesized via the Diels-Alder addition of the corresponding butadienes 11 and maleic anhydride 12 (Scheme 6).

SCHEME 6

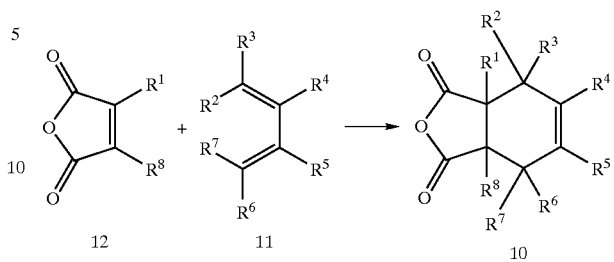

A unique feature of the present invention is the ability to effectively crosslink during processing. Following processing the resulting tetrahydrophthalimides undergo thermo-oxidative aging primarily via path B degradation—aromatization to more oxidatively stable substituted phthalimides—which occurs with very little weight loss. The present invention carefully considered how the substitution affects initial crosslinking. Examples given have crosslinking exotherms, by differential scanning calorimetry, similar to the nadic endcap. In addition, crosslinking proceeds through the double bond the same as nadic, giving an identical crosslink skeleton. Hence, Tg and other physical properties are similar to polymers containing NE. The main advantage of preserving the same crosslinking scheme and physical properties as nadic, while controlling the degradation, is faster industry acceptance of the resulting new polymer as a matrix material for composites applications where higher use temperatures or longer lifetimes are desired.

The commercial potential of this invention is quite high. The replacement endcaps could substantially increase the lifetime and use temperatures of polymer matrix composites, allowing for use in engine parts such as inlets, fan ducts and exit flaps for high speed aircraft. Ultimately, the payoff for developing polymer composites that can operate in higher temperature environments is weight savings e.g. from −10–20% over the engine part made with conventional materials like titanium. In addition, since the new endcaps preserve the desired processibility as NE, no unconventional methods and or new equipment is needed to utilize the invention.

The carboxylic endcaps of this invention are useful as a replacement in the original PMR (Polymerization of Monomer Reactants) technology for producing large void free polyimide fiber composites. The principal resin in the PMR family, PMR-15, is commercially available and is regarded as the industry standard for aircraft engine applications for long term use at temperatures ranging up to 500° F. (260° C.). The PMR-15 components are currently being used in both military and commercial aircraft engines, and the use of the novel carboxylic endcaps would substantially improve the oxidative stability of these aircraft components.

The following are some specific examples of prior art tetracarboxylic acid dianhydrides that can be used for practicing this invention which includes:

2,3,3',4'-benzophenonetetracarboxylic acid dianhydride
3,3',4,4'-bensophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride 4,4'-isopropylidenediphthalic anhydride
3,3'-isopropylidenediphthalic anhydride
4,4'-oxydiphtalic anhydride
4,4'-sulfonyldiphthalic anhydride
3,3'-oxydiphthalic anhydride
4,4'-methylenediphthalic anhydride
4,4'-thiodiphthalicanhydride
4,4'-ethylidenediphthalic anhydride
hexafloroisopropylidene bisphthric anhydride (6FOA),
phenyltrifluoroekylidene bisphthalic anhydride (3ROA),
2,3,6,7-naphthalenetetracarboxylic acid dianhydride
1,2,5,6-naphthalenetetracarboxylic acid dianhydride
benzene-1,2,3,4,-tetracarboxylic acid dianhydride
pryazine-2,3,5,6-tetracarboxylic acid dianhydride
thiophene-2,3,4,5-tetracarboxylic acid dianhydride, and the various lower alkyl esters thereof.

The preferred polyfunctional amines are the aromatic diamines containing at least one benzene ring which includes:
para-phenylenediamine
meta-phenylenediamine
4,4'-diaminodiphenylpropane
4,4'-diaminodiphenylmethane benzidine
4,4'-diaminodiphenyl sulfide
4,4'-diaminodiphenyl sulfone
3,3'-diaminodiphenyl sulfone
4,4'-diaminodiphenyl ether
1,5-diaminonaphthalene
3,3'-dimethoxybenzidine
3-methylheptamethylene diamine
4,4'-dimethylheptamethylene diamine
2,11-diaminododecane
bisaniline
bisaniline-m-xylidene
bisaniline-p-xylidene
3,3'-diaminobenzophenone
4,4'-diaminobenzopheneone
3,3'-diaminodiphenylether
3,4'-diaminodiphenylether
4,4'-diaminodiphenylmethane
2,2'-dimethylbenzidine
3,3'-dimethylbenzidine etc.
and triamines such as
1,3,5-triaminobenzene
2,4,6-triamino-s-triazine
4,4',4''-triaminotriphenylmethane
4,4',4''-triaminotriphenylcarbinol The polyimides of this invention are prepared from mixtures of polyimide-forming monomers which consist essentially of about N moles of the tetracarboxylic dianhydride, N+1 moles of the aromatic diamine and about 2.0 moles of the carboxylic endcap of this invention wherein the value of N ranges from about 2 to 30. The monomeric mixture of polyimide-forming monomers is heated at temperatures ranging from about 200° to 400° C.

For purposes of this invention the term carboxylic endcap as used herein includes the carboxylic anhydrides and the lower $C_1$–$C_6$ primary and secondary alkyl esters and ester-acids thereof, wherein $R^1$, $R^2$, $R^3$, $R^4$, $R^5$, $R^6$, $R^7$ and $R^8$ are radicals as defined herein. Specifically, the present invention is directed to a class of novel carboxylic endcaps of structures shown above, comprising 1,2,3,6-tetrahydrophthalic anhydride endcaps substituted so as to primarily undergo crosslinking during processing by inhibiting aromatization, and thereafter primarily follow path B degradation during aging. One embodiment is substitution at positions 1 and/or 2 by $R^1$ and/or $R^8$, respectively, as well as various substitutions at positions 3, 4, 5 and/or 6-position with substituents $R^2$, $R^3$, $R^4$, $R^5$, $R^6$ and $R^7$. Another embodiment is disubstitution of the 1,2,3,6-tetrahydrophthalic anhydride endcaps at positions 3 and/or 6 by $R^2$ and $R^3$ and/or $R^6$ and $R^7$, respectively, as well as variously substituted at positions 1, 3, 4, and 5 with substituents $R^1$, $R^4$, $R^5$ and $R^8$.

The following examples illustrate the improved polyimides obtained by using the novel processing conditions of this invention.

EXAMPLE 1

Imidized 1500 molecular weight molding powders and crosslinked neat resin disk from 2,3-dimethy-1,2,3,6-tetrahydrophthalic anhydride (2,3-DMTHPA). 2,3-DMTHPA (3.60 g, 20 mmole), 3,3'4,4'-benzophenonetetracarboxylic dianhydride, BTDA (6.73 g, 20.87 mmole and 4,4'-methylenedianiline, MDA (6.12 g 30.87 mmole) were ground together with mortar and pestle to give an intimate mixture of the three monomers. The off-white powder was imidized in an air circulating oven at 200° C. for 1 hour followed by an additional half hour at 230° C. The yellow solid was finely ground with mortar and pestle to give a powder that was fully imidized, as evidenced by NMR and FT-IR. Compression molding at 345° C. for 2 hours gave a neat resin disk with good consolidation and low frangibility. NMR analysis revealed the THPA endcaps to be 100% cross-linked. The following illustrates the polymerization. Scheme 7 illustrates the polymerization.

SCHEME 7

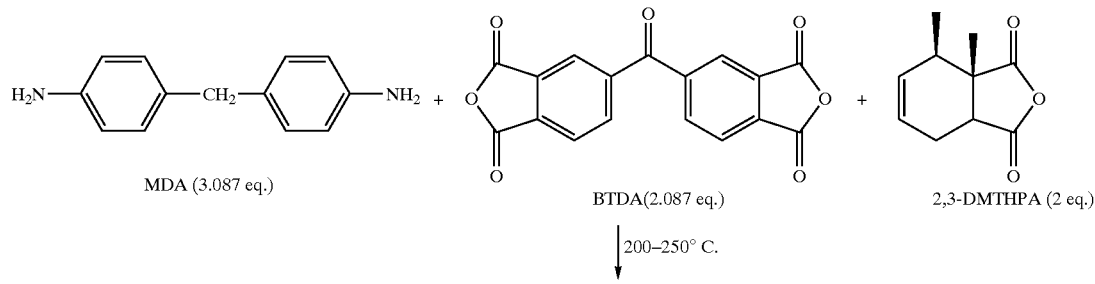

-continued

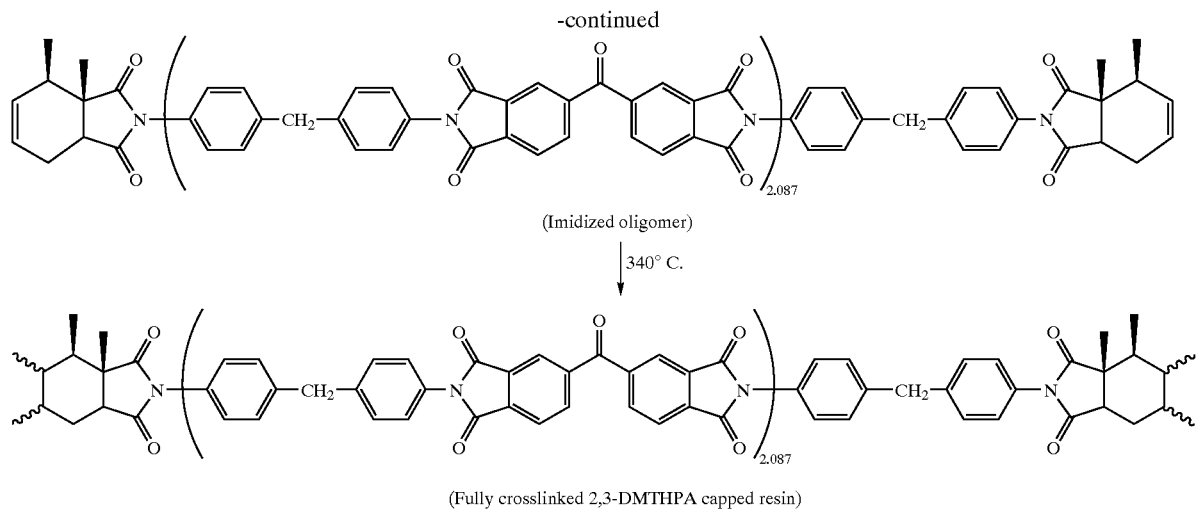

(Imidized oligomer)

↓ 340° C.

(Fully crosslinked 2,3-DMTHPA capped resin)

EXAMPLE 2

Imidized 1500 molecular weight molding powders and crosslinked neat resin disk from 1,3-dimethy-1,2,3,6-tetrahydrophthalic anhydride (1,3-DMTHPA). 1,3-DMTHPA (3.60 g, 20 mmole), 3,3'4,4'-benzophenonetetracarboxylic dianhydride, BTDA (6.73 g, 20.87 mmole and 4,4'-methylenedianiline, MDA (6.12 g 30.87 mmole) were ground together with mortar and pestle to give an intimate mixture of the three monomers. The off-white powder was imidized in an air circulating oven at 200° C. for 1 hour followed by an additional half hour at 230° C. The yellow solid was finely ground with mortar and pestle to give a powder that was fully imidized, as evidenced by NMR and FT-IR. Compression molding at 345° C. for 2 hours gave a neat resin disk with good consolidation and low frangibility. NMR analysis revealed the THPA endcaps to be 100% cross-linked.

EXAMPLE 3

Imidized 1500 molecular weight molding powders and crosslinked neat resin disk from 3,3-dimethy-1,2,3,6-tetrahydrophthalic anhydride (3,3-DMTHPA). 3,3-DMTHPA (3.60 g, 20 mmole), 3,3'4,4'-benzophenonetetracarboxylic dianhydride, BTDA (6.73 g, 20.87 mmole and 4,4'-methylenedianiline, MDA (6.12 g 30.87 mmole) were ground together with mortar and pestle to give an intimate mixture of the three monomers. The off-white powder was imidized in an air circulating oven at 200° C. for 1 hour followed by an additional half hour at 230° C. The yellow solid was finely ground with mortar and pestle to give a powder that was fully imidized, as evidenced by NMR and FT-IR. Compression molding at 345° C. for 2 hours gave a neat resin disk with good consolidation and low frangibility. NMR analysis revealed the THPA endcaps to be 100% cross-linked.

The polyimides of this invention particularly underscore the importance of PMR resins to the aerospace industry and the benefits of using this novel class of carboxylic endcaps in current PMR systems. This invention represents a significant advancement in simplifying the manufacture and fabrication of PMR polyimides and the use thereof in the preparation of prepregs and composites by providing improved and consistent processibility.

In preparing the fibrous composites of this invention, the fibers can be short fibers or whiskers, but are frequently continuous fibers consisting of fibers in the form of filaments or cloth. The preferred fibrous materials in the composites are, for example, carbon, graphite, glass, asbestos, or boron fibers. The term "fibrous material" includes fibers, filaments, continuous filaments, strands, bundles, whiskers, cloth, felt and combinations thereof. The fibrous material can be amorphous, crystalline, or mixture thereof. Fibers may be monofilaments or tows of 100 to 6000 filaments. When used in preparing the composites of this invention they may be woven into fabrics, pressed into mats, or aligned to obtain the required physical properties.

While this invention has been described by a number of specific examples, it is obvious that there are other variations and modifications that can be made without departing from the spirit and scope of the invention as set forth in the appended claims.

The invention claimed:

1. Polyimides having improved thermal-oxidative stability derived from the polymerization of effective amounts of at least one polyamine, at least one tetracarboxylic dianhydride and a dicarboxylic endcap having a formula:

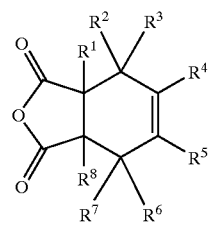

wherein $R^1$ is selected from the group consisting of an alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbons; and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbon atoms.

2. Polyimides having improved thermal-oxidative stability derived from the polymerization of effective amounts of at least one polyamine, at least one tetracarboxylic dianhydride and a dicarboxylic endcap having a formula:

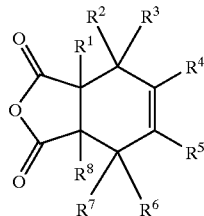

wherein $R^2$ and $R^3$ are the same or different radicals selected from the group consisting of alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbons; and wherein, $R^1$, $R^4$, $R^5$, $R^6$, $R^7$, $R^8$ are the same or different radicals selected from the group consisting of alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbons.

3. The polyimide of claim 1 wherein the dicarboxylic endcap is 2,3-dimethyl-1,2,3,6-tetrahydrophthalic anhydride.

4. The polyimide of claim 1 wherein the dicarboxylic endcap is 1,3-dimethyl-1,2,3,6-tetrahydrophthalic anhydride.

5. The polyimide of claim 1 wherein the dicarboxylic endcap is 3,3-dimethyl-1,2,3,6-tetrahydrophthalic anhydride.

6. The polyimides of claim 1 wherein the polyamine is an aromatic polyamine.

7. The polyimide of claim 6 wherein the aromatic polyamine is an aromatic diamine.

8. The polyimide of claim 6 wherein the aromatic polyamine is 4,4'-methylene dianiline.

9. The polyimide of claim 8 wherein the tetracarboxylic dianhydride is 3,3',4,4'-benzophenonetetracarboxylic dianhydride.

10. The polyimide of claim 9 wherein the dicarboxylic endcap is 2,3-dimethyl-1,2,3,6-tetrahydrophthalic anhydride.

11. The polyimides of claim 2 wherein the polyamine is 4,4'-methylene dianiline.

12. The polyimides of claim 11 wherein the tetracarboxylic dianhydride is 3,3',4,4'-benzophenonetetracarboxylic dianhydride.

13. The polyimides of claim 12 wherein the dicarboxylic endcap is 2,3-dimethyl-1,2,3,6-tetrahydrophthalic anhydride.

14. The process of preparing polyimides having improved thermal-oxidative stability derived from the polymerization of effective amounts of at least one aromatic polyamine, at least one tetracarboxylic dianhydride and a dicarboxylic endcap having a formula:

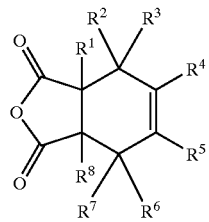

wherein $R^1$ is a radical selected from the group consisting of an alkyl, fluoroalkyl, aryl, fluoroaryl, OR, carboxy, nitro cyano, R—N—R, $SO_3R$, $PO_4R$, F and Cl radicals where R is selected from the group consisting of hydrogen, aryl radicals and alkyl radicals of 1 to 6 carbons; and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, aryl radicals and alkyl radicals of 1 to 6 carbons.

15. The process of claim 14 wherein the aromatic polyamine is 4,4'-methylene dianiline.

16. The process of claim 15 wherein the tetracarboxylic dianhydride is 3,3',4,4'-benzophenonetetracarboxylic dianhydride.

17. The process of claim 16 wherein the dicarboxylic endcap is 2,3-dimethyl-1,2,3,6-tetrahydrophthalic anhydride.

18. The process of claim 14 wherein $R^2$ and $R^3$ are the same or different radicals selected from the group consisting of alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, aryl radicals and alkyl radicals of 1 to 6 carbons, and wherein $R^1$, $R^4$, $R^5$, $R^6$, $R^7$, $R^8$, are the same or different radicals selected from the group consisting of hydrogen, alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, aryl radicals and alkyl radicals of 1 to 6 carbons.

19. Fiber-reinforced high-temperature polyimide matrix composites comprising a fibrous material impregnated with an effective amount of a polyimide having improved thermal-oxidative stability; said polyimide derived from the polymerization of at least one polyamine, at least one tetracarboxylic dianhydride and a dicarboxylic endcap having the formula:

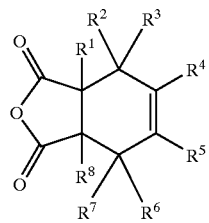

wherein $R^1$ is selected from the group consisting of an alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbons; and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, R—N—R, $SO_3R$, $PO_4R$, F and Cl radicals, where R is selected from the group consisting of hydrogen, an aryl radical, and an alkyl radical of 1 to 6 carbon atoms.

20. The composites of claim 19 wherein the fiberous material comprises carbon fibers.

21. The composites of claim 19 wherein the fiberous materials comprises glass fibers.

22. A process of preparing a fiber-reinforced prepreg which comprises impregnating a fiberous material with an effective amount of a polyimide prepolymer derived from at least one polyamine, at least one tetracarboxylic dianhydride and a dicarboxylic endcap having the formula:

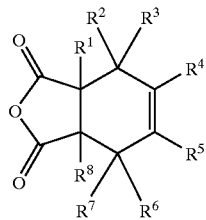

wherein $R^1$ is selected from the group consisting of an alkyl, fluoroalkyl, aryl, fluoroaryl, OR, carboxy, nitro, cyano, R—N—R, $SO_3R$, $PO_4R$, F and Cl radicals where R is selected from the group consisting of hydrogen, an aryl radical, and an alkyl radical of 1 to 6 carbons; and wherein $R^2$, $R^3$, $R^4$, $R^5$, $R^6$, $R^7$, and $R^8$ are the same or different radicals selected from the group consisting of hydrogen, alkyl, fluoroalkyl, aryl, fluoroaryl, OR, carboxy, nitro, cyano, R—N—R, $SO_3R$, $PO_4R$, F and Cl radicals, where R is selected from the group consisting of hydrogen, an aryl radical, and an alkyl radical of 1 to 6 carbon atoms.

23. The prepreg obtained by the process of claim 22

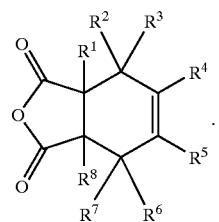

* * * * *